Oct. 28, 1952 K. SCHLESINGER 2,615,978

PULSE WIDTH SEPARATION FILTER

Filed Oct. 14, 1947 2 SHEETS—SHEET 1

INVENTOR.
Kurt Schlesinger
BY
Toorman L. Mueller
Attorney

INVENTOR.
Kurt Schlesinger

BY
Foorman L. Mueller

Attorney

Patented Oct. 28, 1952

2,615,978

UNITED STATES PATENT OFFICE 2,615,978

PULSE WIDTH SEPARATION FILTER

Kurt Schlesinger, Maywood, Ill., assignor to Motorola, Inc., Chicago, Ill., a corporation of Illinois Application October 14, 1947, Serial No. 779,726

2 Claims. (Cl. 178—7.3)

This invention relates generally to filters and more particularly to a filter for separating the vertical synchronization pulses from the complete television synchronization signal which includes both horizontal and vertical pulses.

In present televisions systems, a composite video signal is used which includes picture elements and synchronizing pulses interspersed with each other. The synchronizing pulses are of two separate frequencies, the high frequency horizontal or line pulses and the low frequency vertical or field pulses. The pulses are of equal amplitude but different widths so that separating means must be able to distinguish between the pulses of different widths. In prior systems various integrating and differentiating circuits have been used to separate the pulses, and these systems have been generally satisfactory for isolating the high frequency horizontal pulses from the complete synchronization signal. These systems have not, however, provided a sufficiently steep pulse on the vertical or line frequency to be entirely satisfactory. As the pulses produced are not steep, circuits controlled thereby will not always be triggered at exactly the same instant resulting in improper interlacing of the fields in the receiver. Prior filter circuits have also not completely eliminated the high frequency or horizontal pulses with the result that these pulses often cause improper triggering of the circuit. Attempts have been made to eliminate this difficulty by the use of various clipper or separator tubes and, although such circuits have provided proper results, the systems have been relatively expensive and complicated and are, therefore, objectionable.

It is, therefore, an object of the present invention to provide an improved filter for distinguishing between pulses of different widths.

It is a further object of this invention to provide a filter for use in a television receiver which separates the vertical synchronization pulses from the complete synchronization signal and provides a sharp pulse suitable for triggering a deflection oscillator.

A feature of this invention is the provision of a low pass filter which by-passes the high frequency horizontal pulses and provides a steep output wave at the vertical synchronization signal frequency.

A further feature of this invention is the provision of a filter having a shunt arm which is resonant at the frequency of the horizontal or line pulses to by-pass these pulses and which passes all frequencies from the frequency of the vertical or field pulses up to about 80 per cent of the frequency of the horizontal pulses so that a sharp output pulse is provided which may be used to trigger oscillators directly without the use of additional clipper or separator tubes.

A still further feature of this invention is the provision of a "bridged-T" network so designed that both the horizontal and vertical synchronization pulses can be derived therefrom with the vertical pulses being sufficiently steep for triggering a scanning oscillator.

Further objects, features and advantages will be apparent from a consideration of the following description taken in connection with the accompanying drawings in which.

Figure 8:
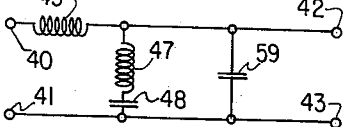
Figure 9:
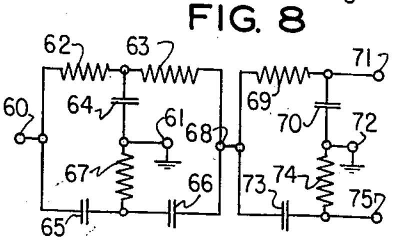
Figure 10:
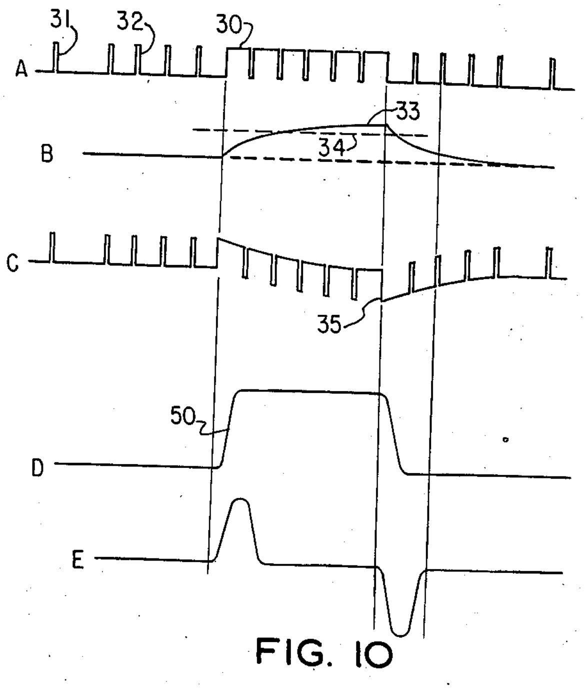

Figs. 5 to 9, inclusive, illustrate modified filter circuits in accordance with the invention; and Fig. 10 illustrates response curves of known circuits and of the circuits in accordance with the invention.

In accordance with the invention there is provided a filter for producing sharp pulses for controlling the vertical scanning generator or oscillator of a television system from the combined synchronization signal which includes both horizontal and vertical synchronization pulses. The filter provides output pulses having steep slopes which are, therefore, suitable for controlling standard scanning oscillators without the use of a clipper tube or other relatively complicated and expensive means. The filter is adapted to pass all frequencies from the vertical synchronization frequency up to about 80 per cent of the line synchronization frequency. Almost complete attenuation of the line frequency is provided by the use of a shunt arm so designed to resonate at the line frequency. By the use of a differentiating condenser in the filter, a double pulse output may be provided in which positive and negative pulses are produced. One of these pulses may be used for controlling the scanning generator and the other for providing any other desired control function (such as a black-level control). The invention may take various forms as will be described more in detail hereinafter.

Figure 1:
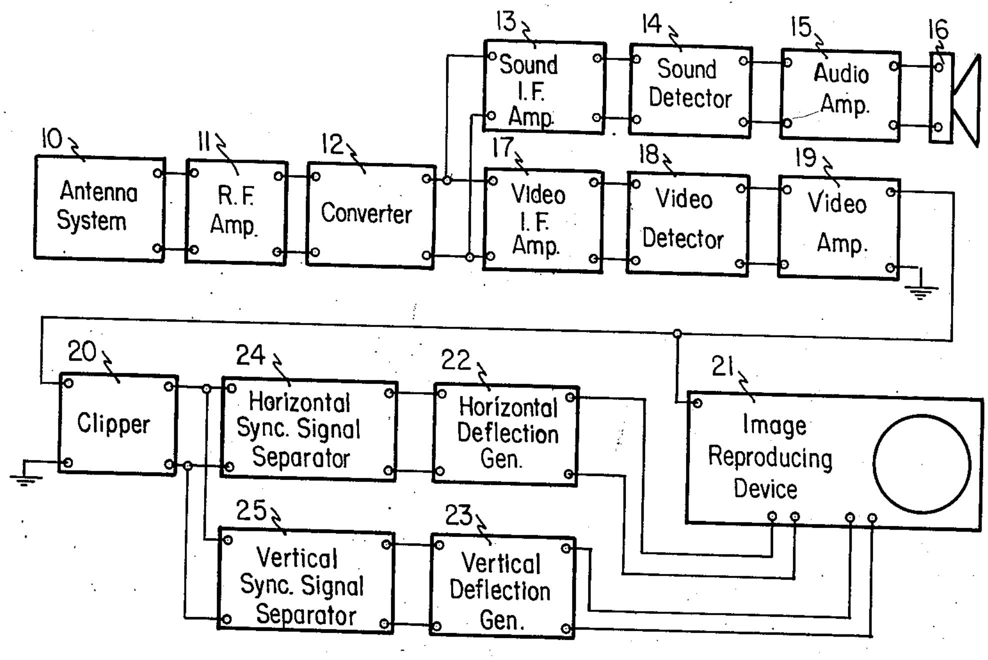
Fig. 1 illustrates a television system in which the synchronization signal separation filter in accordance with the invention may be used.

Referring now more particularly to the drawings, in Fig. 1 there is illustrated a television receiver system in which the synchronization pulse separation filter in accordance with the invention may be utilized. The receiver is illustrated as including an antenna system 10 adapted to intercept radio frequency signals and apply them to radio frequency amplifier 11 wherein the signals are selected and amplified. The amplified radio frequency signals are applied to converter 12 wherein they are reduced in frequency resulting in intermediate frequency signals which are applied to the sound intermediate frequency amplifier 13 and the video frequency amplifier 17. The sound signals are selected and amplified in the intermediate frequency amplifier 13 and applied to sound detector 14 wherein audio frequencies are derived. The audio frequencies are amplified in audio amplifier 15 and reproduced in sound reproducing device 16 in a well known manner.

The video signals are selected and amplified in intermediate frequency amplifier 17 and detected from the intermediate frequency wave by the detector 18. The resulting video signals are amplified in video amplifier 19 and applied to clipper 20 and image reproducing device 21. The image reproducing device includes means for producing the beam of electrons and means for causing the beam to scan a screen to reproduce an image. The intensity of the beam is controlled by the video signal so that the intensity of the beam varies with the amplitude of the video signal. The synchronization signals are obtained from the video signal by clipper 20 and utilized to control horizontal deflection generator 22 and vertical deflection generator 23. For producing pulses for controlling the horizontal and vertical deflection generators from the output of the clipper which includes both horizontal and vertical synchronization signals, horizontal and vertical synchronization signal separators 24 and 25 are required. The means for deflecting the electron beam may be either electromagnetic or electrostatic and are coupled to the horizontal deflection generator 22 and vertical deflection generator 23 which are adapted to produce either sawtooth current waves or sawtooth voltage waves depending upon the type of deflection used in the image reproducing device.

Figure 2:
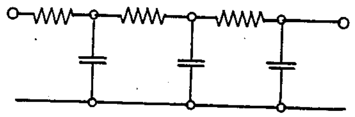
Figs. 2 and 3 illustrate presently used circuits for obtaining vertical synchronization pulses.

For separating the horizontal and vertical synchronization pulses from the complete synchronization signal various filter circuits have been used. In many of these circuits clipper or separator tubes are required to provide vertical synchronization pulses of sufficient sharpness for satisfactory control of scanning oscillators. In obtaining the high frequency horizontal pulses from the complete synchronization signal no serious difficulties have been encountered. In Fig. 10, curve A illustrates the standard wave form of synchronization pulses which are produced by well known clipper circuits. It is apparent that the pulses are of equal amplitude with the vertical pulses 30 being of longer duration than the horizontal pulses 31. A plurality of equalizing pulses 32 occurring at twice the frequency of the horizontal synchronization pulses are provided immediately before and after the vertical pulses. In attempting to separate the vertical pulses from the complete synchronization signal by the use of integration circuits as illustrated in Fig. 2, the output of the filter produces a wave form as illustrated in curve B of Fig. 10. It is apparent that the pulse 33 provided is not steep but on the contrary rises at a relatively small angle. If it is desired to synchronize a circuit by use of this pulse and trigger the circuit when the pulse reaches a predetermined amplitude as indicated by the line 34, for example, it is apparent that the point in time when the pulse 33 reaches this level will vary widely in response to slight variation in the over-all amplitude of the pulse. This, therefore, will not provide sharp control of a circuit. For example, the use of such a pulse for controlling the vertical deflection generator of a television receiver will not positively lock the generator with the vertical pulses at the same time in each cycle. This produces a sponginess in the control with the result that the interlace between fields will not be accurate and the lines in the received picture will be paired.

Figure 3:
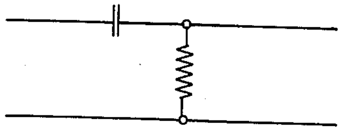

In Fig. 3 there is illustrated a differentiating circuit which has been used in an attempt to separate the vertical pulses from the horizontal synchronization pulses. The output of such a filter is illustrated by curve C in Fig. 10. It is apparent that in such a filter the high frequency pulses pass through the circuit unattenuated. There is, however, an overshoot at the end of the low frequency pulses indicated at point 35 which may be used as a controlling pulse. However, as this overshoot is of relatively small amplitude, in order to provide satisfactory triggering of an oscillator it is necessary that a clipper tube or some other special means be provided for providing a satisfactory pulse therefrom.

Figure 4:
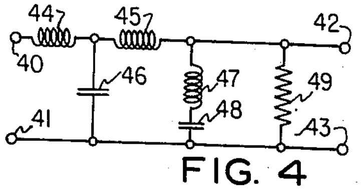
Fig. 4 illustrates a filter circuit in accordance with the invention.

In accordance with the invention there is provided a filter which overcomes the difficulties set forth above with reference to the presently used integration and differentiation circuits. One form in which this circuit may be embodied is illustrated in Fig. 4 in which the filter includes input terminals 40 and 41 and output terminals 42 and 43. Connected to the input terminal 40 are inductors 44 and 45 in series with condenser 46 being connected from the common point between the inductors to the terminal 41. A shunt arm including inductor 47 and condenser 48 is bridged across the lines and a terminating resistor 49 is provided between the the output terminals 42 and 43. The shunt arm including inductor 47 and condenser 48 is tuned to resonate at the horizontal or line frequency (15,750 cycles). The constants of the filter are so selected that the cut-off frequency is approximately 12.6 kilocycles being, therefore, about 80 per cent of the line frequency. The filter actually has two sections with the inductor 44 and condenser 46 forming a low pass section having a cut-off at a frequency of the order of 80 percent of the line frequency, and the inductors 45 and 47 and the condenser 48 forming a series "*m*" derived section having a cut-off at approximately 80 percent of the line frequency and maximum attenuation at the line frequency. The wave appearing on the output terminals 42 and 43 of the filter when the complete synchronization signal is applied thereto is shown by curve D of Fig. 10. It is noted that the slanting portion 50 is of such steepness to provide an amplitude change of about 30 decibels during the period of one vertical pulse which lasts for about 60 microseconds. This is a sufficiently sharp pulse to trigger a scanning oscillator as the shift in the time of triggering due to variation of amplitude of the pulse is negligible. For example, considering curve D in Fig. 10, it is apparent that a range of 10 decibels would shift the time axis a small portion of the width of a vertical synchronization pulse or in the order of 10 microseconds. Such a range would not be objectionable not being enough to cause improper interlace and pairing of lines in the television receiver.

It is obvious that the filter circuit of Fig. 4 can be modified in various ways to provide other desirable effects without departing from the fundamental features as above described. For example, in Fig. 5 there is illustrated a modified circuit in which the termination is changed by the addition of a differentiating condenser 51. This provides a double pulse output, that is, a positive pulse and a negative pulse as shown by curve E in Fig. 10. By comparision of curves D and E, it is apparent that the positive pulse of curve E builds up with substantially the same sharpness as the pulse of curve D. Therefore, this pulse would provide the same sharp triggering action as described with reference to curve D. In addition, the second or negative pulse may be used for other control functions if desired. In circuits tested no trouble was experienced with reflections due to improper termination of the filter at low frequencies.

Figure 6:
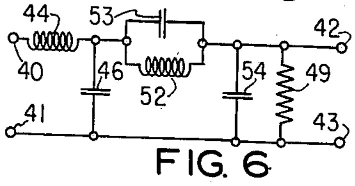

In Fig. 6 a shunt "*m*" derived filter network is illustrated which is functionally equivalent to the series "*m*" derived network of Fig. 4. This filter includes a low pass section composed of inductor 44 and condenser 46 as in Fig. 4 and a second section including a parallel tuned circuit comprised of inductor 52 and condenser 53 and shunt condenser 54, which is a shunt "*m*" derived section having a cut-off at about 80 percent of the line frequency and maximum attenuation at the line frequency. The network is terminated by resistor 49. The parallel circuit composed of inductor 52 and condenser 53 is tuned to block the fundamental frequency of the horizontal or line synchronization pulses so that this frequency will be absent from the output of terminals 42 and 43. The output will correspond generally to curve D in Fig. 10.

Figure 7:
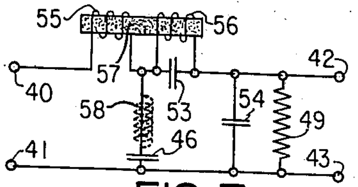

The circuit of Fig. 7 is generally similar to the circuit of Fig. 6 except that the inductors 44 and 52 are replaced by inductors 55 and 56 which are wound on an iron core 57. The mutual inductance between the coils 55 and 56 has the effect of providing inductance in series with the condenser 46 as indicated by the dotted coil marked 58. The shunt path including the inductance 58 and the condenser 46 is effective to by-pass the line frequencies, and the filter in addition to having low pass characteristics is also effective to eliminate the fundamental frequency of the line.

Figure 5:
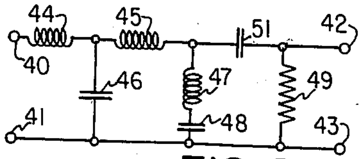

In Fig. 8 there is illustrated a still further filter circuit which is considerably simpler than the circuits of Figs. 4 and 5. In this circuit a resonant peak is provided in the output wave at twice the line frequency. This is provided by a condenser termination 59 which resonates with the shunt circuit including inductor 47 and condenser 48 at twice the line frequency (31.5 kilocycles) to enhance the effect of the equalization pulses. To provide this resonant circuit, the condenser 59 is selected to have a value one-third that of condenser 48. This provides sharp pulses or spikes at twice the line frequency superimposed on the output wave of the filter which improve the action of the wave in a well known manner. This same result can be provided in similar shunt derived filter circuits such as the circuits shown herein.

In Fig. 9 there is illustrated a "bridged-T" network which is so constructed to embody the features of the invention. In this circuit the input is applied to terminals 60 and 61 with the terminal 61 being grounded. This includes two parallel bridged circuits, one including series resistors 62 and 63 and shunt condenser 64 and the other including series condensers 65 and 66 and shunt resistor 67. The output of the filter is obtained at point 68. In accordance with the invention the fundamental of the line frequency is by-passed and does not appear at point 68. However, the vertical frequency and harmonics thereof and also the harmonics of the line frequency are passed and appear at point 68. By providing proper terminations, pulses of both the vertical and horizontal frequencies can be obtained from the filter for controlling vertical and horizontal generators, respectively. Pulses of vertical frequency are derived by the section including resistor 69 and condenser 70 and appear between terminal 71 and ground 72. The high frequency horizontal pulses are derived by the section including condenser 73 and resistor 74 and appear between terminals 75 and ground 72. When using such a circuit in the system of Fig. 1, the "bridged-T" network will take the place of both the horizontal and vertical synchronization signal separators. The output of the clipper 20 will be applied directly to the terminals 60 and 61 with the horizontal deflecting generator obtaining synchronization pulses from the terminals 72 and 75 and the vertical deflection generator obtaining synchronization pulses between the terminals 71 and 72.

Although it is possible to provide many different variations of circuits operating in accordance with the invention, the series and shunt "*m*" derived networks of Figs. 4 and 6 are typical. In systems actually tested the following values have been found to provide filters in which the vertical synchronization pulses are satisfactorily obtained from the complete synchronization signal:

*Figure 4*

| | |
|---|---|
| Inductor 44 | 63 microhenries |
| Condenser 46 | .01 microfarad |
| Inductor 45 | 38 microhenries |
| Inductor 47 | 16.7 microhenries |
| Condenser 48 | .006 microfarad |
| Resistor 49 | 2500 ohms |

*Figure 6*

| | |
|---|---|
| Inductor 44 | 63 microhenries |
| Condenser 46 | .01 microfarad |
| Inductor 52 | 38 microhenries |
| Condenser 53 | 2650 micromicrofarads |
| Condenser 54 | .006 microfarad |
| Resistor 49 | 2500 ohms |

As will be apparent to those skilled in the art, many circuits can be constructed following the foregoing principles to provide pulse outputs which will be satisfactory for controlling circuits such as scanning oscillators. To illustrate more of these circuits would confuse rather than explain the invention. A fundamental feature of the circuits disclosed is that the line frequency is substantially completely attenuated and the field frequency and harmonics thereof up to a frequency of about 80 per cent of the line frequency are passed. This provides a very steep pulse wave so that the time in the cycle at which a particular amplitude level in the pulse wave is reached does not change substantially with the over-all amplitude of the pulse. Therefore, very sharp control of a circuit can be provided by the pulse output of the filter.

While I have described certain forms in which the invention may be embodied it is apparent that various changes and modifications can be made therein without departing from the intended scope of the invention as defined in the appended claims.

I claim:

1. In a television system including means foi producing a synchronization signal including vertical synchronization pulses and horizontal synchronization pulses which occur at much higher frequency than said vertical synchronization pulses, and in which all said pulses are square waves of the same amplitude with said vertical pulses being of longer duration than said horizontal pulses, means for producing from said signal a wave which includes pulses which correspond in time to said vertical pulses comprising, a low pass filter having a first section including a series inductor and a shunt condenser and a second section including an inductor and a condenser connected in parallel and a shunt condenser, said components of said low pass filter having such values that the frequency of said vertical pulses and harmonics thereof up to frequencies only slightly less than the frequency of said horizontal pulses are passed without substantial attenuation, and a common magnetic core for said inductors to provide mutual inductance therebetween, said mutual inductance together with said shunt condenser of said first section forming a by-pass for the fundamental frequency of said horizontal pulses to substantially attenuate the same.

2. In a television system including means for producing a synchronization signal including vertical synchronization pulses and horizontal synchronization pulses which occur at much higher frequency than said vertical synchronization pulses, and in which all said pulses are square waves of the same amplitude with said vertical pulses being of longer duration than said horizontal pulses, means for producing from said signal a wave which includes pulses which correspond in time to said vertical pulses comprising, a low pass filter arranged to pass the frequency of said vertical pulses and a plurality of harmonics thereof, said filter having a first section including a series inductor and a shunt condenser and a second section including an inductor and a condenser connected in parallel and a shunt condenser, and a common magnetic core for said inductors to provide mutual inductance therebetween, said components of said second section having such values that said second section substantially blocks the fundamental frequency of said horizontal pulses, said mutual inductance being effectively in series with said condenser of said first section to provide a by-pass for the fundamental frequency of said horizontal pulses so that said horizontal pulses do not appear in the output of said filter.

KURT SCHLESINGER.

REFERENCES CITED

The following references are of record in the file of this patent:

UNITED STATES PATENTS

| Number | Name | Date |
|---|---|---|
| Re. 22,390 | Lewis | Nov. 9, 1943 |
| 2,178,736 | Campbell | Nov. 7, 1939 |
| 2,178,766 | Tolson | Nov. 7, 1939 |
| 2,207,775 | Bedford | July 16, 1940 |
| 2,226,728 | Lalande et al. | Dec. 31, 1940 |
| 2,247,538 | Wheeler | July 1, 1941 |
| 2,292,148 | Moe | Aug. 4, 1942 |

FOREIGN PATENTS

| Number | Country | Date |
|---|---|---|
| 739,207 | France | Jan. 6, 1933 |

OTHER REFERENCES

Bell System Technical Journal, January 1925, vol. IV, No. 1, pp. 96–97.

Electronic Circuits and Tubes, Cruft Electronic Staff, McGraw-Hill Book Co., 1947, p. 233.